United States Patent
Nethi et al.

(10) Patent No.: US 9,912,494 B2
(45) Date of Patent: Mar. 6, 2018

(54) DISTRIBUTED APPLICATION HOSTING ENVIRONMENT TO MASK HETEROGENEITY

(71) Applicant: Cisco Technology, Inc., San Jose, CA (US)

(72) Inventors: Ramesh Nethi, Bangalore (IN); Elango Ganesan, Palo Alto, CA (US); Anand Oswal, Pleasanton, CA (US); Rajesh Tarakkad Venkateswaran, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 14/824,271

(22) Filed: Aug. 12, 2015

(65) Prior Publication Data
US 2017/0048079 A1    Feb. 16, 2017

(51) Int. Cl.
G06F 15/16    (2006.01)
H04L 12/28    (2006.01)
H04L 29/08    (2006.01)

(52) U.S. Cl.
CPC ...... H04L 12/2836 (2013.01); H04L 67/2823 (2013.01); H04L 67/2838 (2013.01)

(58) Field of Classification Search
CPC ............ H04L 12/2836; H04L 67/2823; H04L 67/2838
See application file for complete search history.

(56) References Cited

U.S. PATENT DOCUMENTS

| | | | |
|---|---|---|---|
| 6,421,354 B1 * | 7/2002 | Godlewski | G08C 17/00 340/870.01 |
| 9,380,060 B2 * | 6/2016 | Dubois | H04L 67/141 |
| 9,516,141 B2 * | 12/2016 | Dubois | H04L 69/08 |
| 9,536,056 B2 * | 1/2017 | Dubois | G06F 19/3406 |
| 9,654,567 B2 * | 5/2017 | Dubois | H04L 67/141 |
| 2012/0143981 A1 * | 6/2012 | Ku | H04L 67/12 709/217 |
| 2012/0324069 A1 | 12/2012 | Nori et al. | |
| 2013/0013544 A1 | 1/2013 | Lee | |
| 2014/0215452 A1 | 7/2014 | Hicks et al. | |
| 2014/0244716 A1 | 8/2014 | Stam et al. | |
| 2015/0066926 A1 * | 3/2015 | Dubois | G06F 19/3406 707/737 |
| 2015/0066955 A1 * | 3/2015 | Dubois | G06F 17/301 707/749 |
| 2015/0067176 A1 * | 3/2015 | Dubois | H04L 69/08 709/227 |
| 2015/0189005 A1 * | 7/2015 | Dubois | H04L 67/141 709/217 |
| 2016/0212218 A1 * | 7/2016 | Dubois | H04L 67/141 |
| 2017/0048360 A1 * | 2/2017 | Dubois | H04L 69/08 |

OTHER PUBLICATIONS

"Fog Computing" Wikipedia; Jul. 7, 2015; pp. 1-2.
Bonomi et al. "Fog Computing and Its Role in the Internet of Things" Cisco Systems Inc.; pp. 1-3.

* cited by examiner

*Primary Examiner* — Moustafa M Meky
(74) *Attorney, Agent, or Firm* — Parker Ibrahim & Berg LLC; James M. Behmke; Stephen D. LeBarron (57) ABSTRACT

In one embodiment, a device in a network receives data from one or more other devices in the network via one or more protocol adaptors. The device transforms the received data into a common data model. The device executes a containerized application. The device exposes the transformed data to the application.

20 Claims, 8 Drawing Sheets

DISTRIBUTED APPLICATION HOSTING ENVIRONMENT TO MASK HETEROGENEITY

TECHNICAL FIELD

The present disclosure relates generally to computer networks, and, more particularly, to a distributed application hosting environment to mask heterogeneity.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

Modern LLNs also exhibit a high degree of heterogeneity. Notably, a diverse number of hardware platforms, protocols, interfaces, etc., have emerged to support LLNs. This heterogeneity presents significant challenges to application developers and has led to many LLN services being implemented in the "cloud" (e.g., on remove servers outside of the local LLN). However, this model also places a greater strain on wide area network (WAN) connections between the local LLN and the cloud, which may also have resource constraints in terms of bandwidth, latency, etc. In addition, certain WAN connections (e.g., in rural areas) may exhibit outages and other events that may impinge on the reliability of the network connections.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives data from one or more other devices in the network via one or more protocol adaptors. The device transforms the received data into a common data model. The device executes a containerized application. The device exposes the transformed data to the application.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
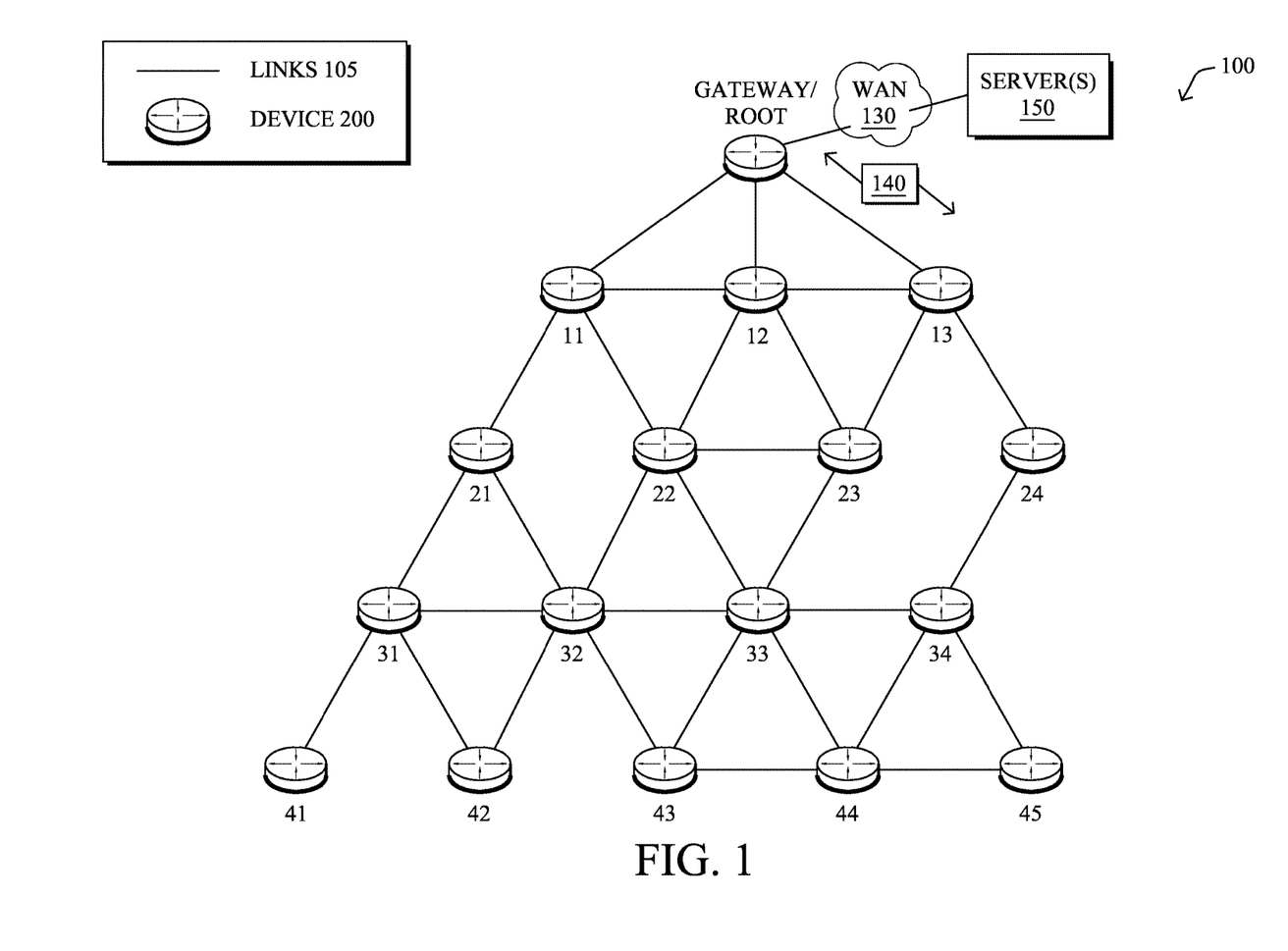
FIG. 1 illustrates an example communication network.

FIG. 1 is a schematic block diagram of an example computer network 100 illustratively comprising nodes/devices 200 (e.g., labeled as shown, a "Gateway/Root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative Gateway/Root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. In some embodiments, network 100 may include a plurality of Gateways/Root nodes that form a backbone of Gateways to which nodes 11-45 etc. may join for routing purposes. Those skilled in the art will understand that any number of nodes, devices, links, etc. may be used in the computer network, and that the view shown herein is for simplicity. Also, those skilled in the art will further understand that while is the network is shown in a certain orientation, particularly with a "Gateway/Root" node/device, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
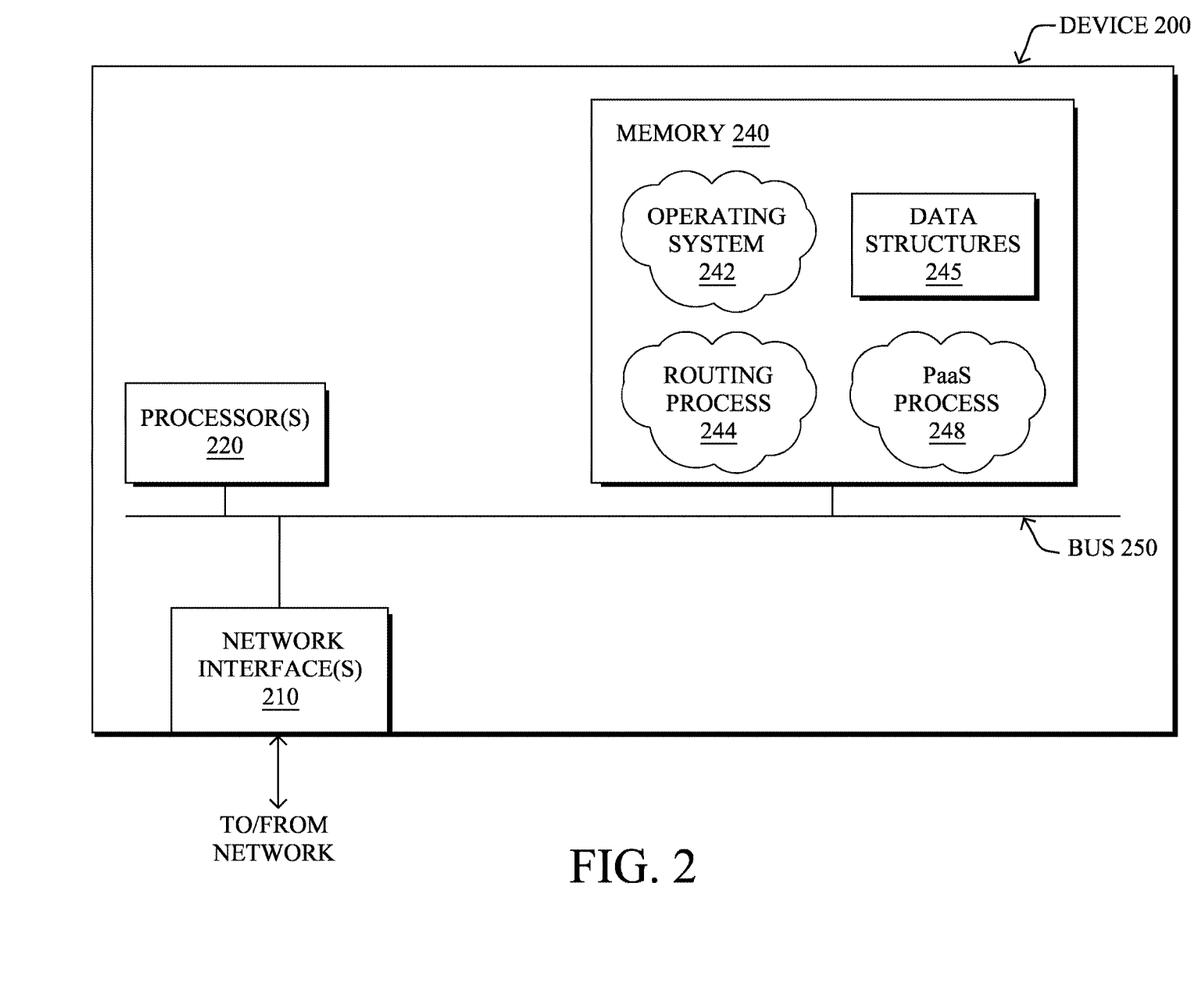
FIG. 2 illustrates an example network device/node.

FIG. 2 is a schematic block diagram of an example node/device 200 that may be used with one or more embodiments described herein, e.g., as any of the nodes shown in FIG. 1 above or described below (e.g., a particular router, sensor, one of servers 150, etc.). The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for is programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and/or an illustrative platform as a service (PaaS) process/service 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes;

6) Nodes may be constrained with a low memory, a reduced processing capability, a low power supply (e.g., battery); and 7) Limited interoperability may exist between the myriad of LLN devices and solutions available from chip manufacturers, sensor manufacturers, communication providers, network providers, middleware providers, solution integrators, etc.

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an IETF Proposed Standard, RFC 6550, entitled "RPL: IPv6 Routing Protocol for Low Power and Lossy Networks" by Winter, et al. (March 2012), provides a mechanism that supports multipoint-to-point (MP2P) traffic is from devices inside the LLN towards a central control point (e.g., LLN Gateways (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). For example, as shown in FIG. 1, the device labeled "Gateway/Root" may function as the DAG root for the various nodes 11-45 shown. Further, in certain embodiments, a sibling of a node within a DAG may be defined as any neighboring node which is located at the same rank within a DAG. Note that siblings do not necessarily share a common parent, and routes between siblings are io generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.). In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG' s primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters." Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.).

As noted above, the heterogeneity of LLNs (e.g., IoT networks) has made application development difficult, since a large variety of different hardware platforms, protocols, and interfaces have evolved to support LLNs. Accordingly, many LLN implementations use a service oriented architecture (SOA), to enable cloud-based applications communicating with the deployed LLN devices. In such cloud-based solutions, processing may take place in a centralized location in the cloud and away from the actual LLN devices. In doing so, this adds to the WAN overhead and may, in some cases, be impractical for certain types of applications, such as applications that require real-time processing or other local decision making.

Distributed Application Hosting Environment to Mask Heterogeneity

The techniques herein provide mechanisms to implement a platform as a service (PaaS) application hosting environment that masks heterogeneity across LLNs and LLN devices. In some aspects, a middleware and framework are disclosed that enable applications to be pushed down to the respective LLNs and LLN devices and away from the cloud, while still providing a service-oriented approach. In further aspects, application lifecycle management techniques are disclosed herein that provide for the deployment and management of applications on LLN devices, while taking into account the various constraints associated with LLNs.

Specifically, according to one or more embodiments of the disclosure as described in detail below, a device in a network receives data from one or more other devices in the network via one or more protocol adaptors. The device transforms the received data into a common data model. The device executes a containerized application. The device exposes the transformed data to the application.

Illustratively, the techniques described herein may be performed by hardware, software, and/or firmware, such as in accordance with the PaaS process 248, which may include computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Figure 3:
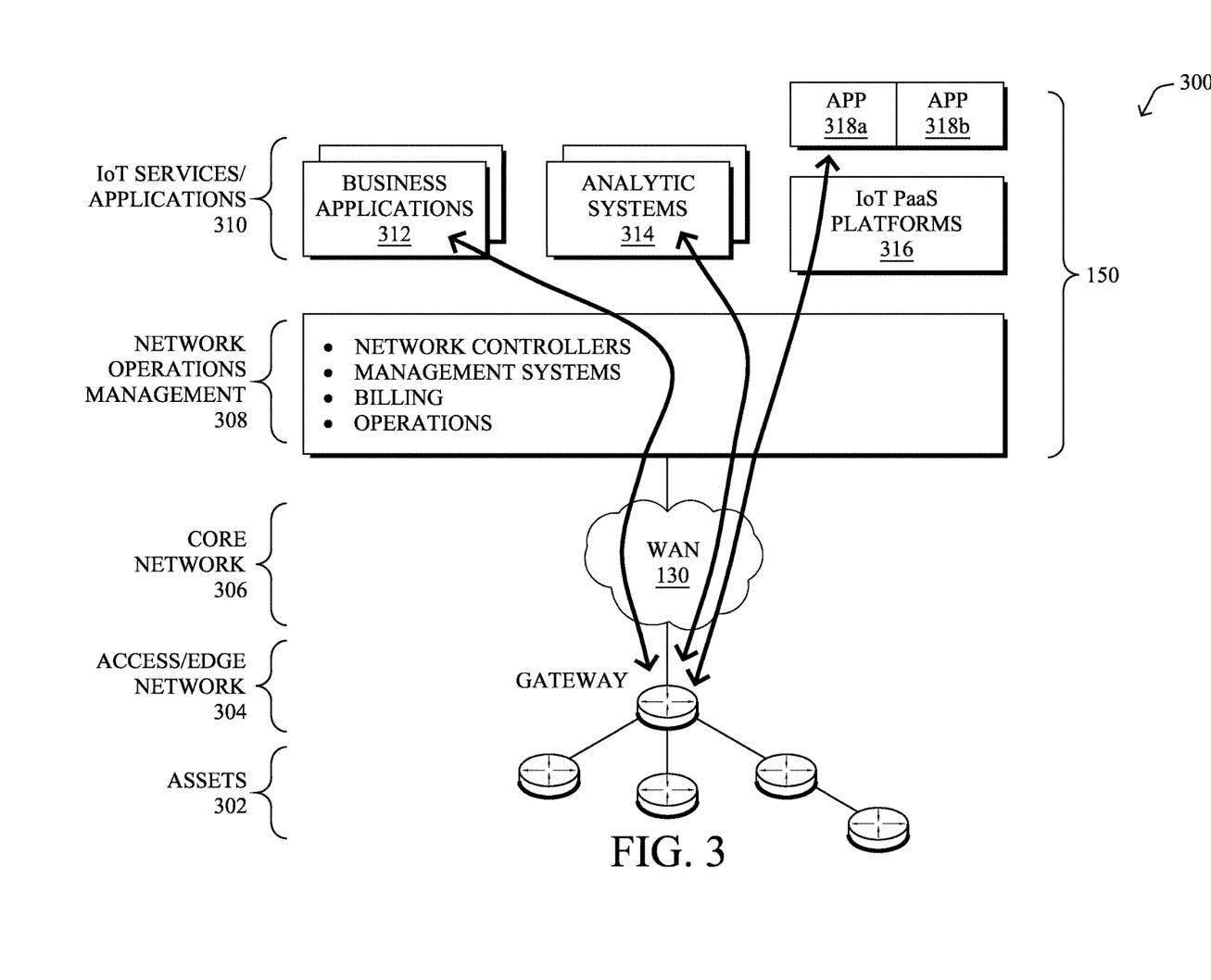
FIG. 3 illustrates an example of the communication network of FIG. 1 in greater detail.

Operationally, an example domain view 300 is shown in FIG. 3 of the computer network 100, according to various embodiments. At the very bottom of view 300 are the various assets 302 (e.g., LLN nodes/devices) deployed within the network. Assets 302 may include, for example, sensors, smart objects, things, motes, etc., which may be embedded into or deployed within a physical environment. In some implementations, the purpose of assets 302 is to "sense" the environment and provide sensor information back to a monitoring application. In further cases, some of assets 302 may be operable to affect the physical environment. For example, a particular device/asset 302 may turn buildings lights on or off, based on a received instruction. As noted previously, assets 302 may typically be deployed in large numbers and may have very limited resources (e.g., processing capabilities, storage, battery life, etc.) in comparison to traditional computing devices.

At the access/network edge 304 may be one or more gateway devices that provide remote connectivity to assets 302. For example, FARs or other gateway devices may be deployed within a physical location, to provide connectivity between assets 302 and a core network 306 (e.g., WAN 130, etc.). In various embodiments, WAN 130 may comprise the public Internet and/or a private network, such as a multi-protocol label switching (MPLS) network or the like. In some embodiments, assets 302 may communicate directly with core network 306 (e.g., directly with the public Internet, with a private network, etc.). However, many assets 302 such as sensors and actuators may lack the functionality to do so.

Also as shown, various network operations management operations 308 may occur at the backend (e.g., in the cloud or at a datacenter/at servers 150). Such operations may include, but are not limited to, network control operations, network management operations, billing operations, other processes that affect the operation/functionality of the network, and the like. For example, an NMS may provide information to the Gateway node that controls how and when assets are to join the local LLN.

Also at the backend may be any number of IoT services/applications 310 that interact with assets 302. Such services/applications may include, for example, business applications 312, analytic systems 314, and/or any number of other applications 318 (e.g., application 318a, 318b, etc.) that may be developed on horizontal or specific IoT PaaS platforms 316. Broadly, services/applications 310 may fall into two categories: 1.) information and analysis (e.g., to gather and interpret sensor information from assets 302) and 2.) automation and control (e.g., to affect the physical environment to which assets 302 are deployed.

Figure 4:
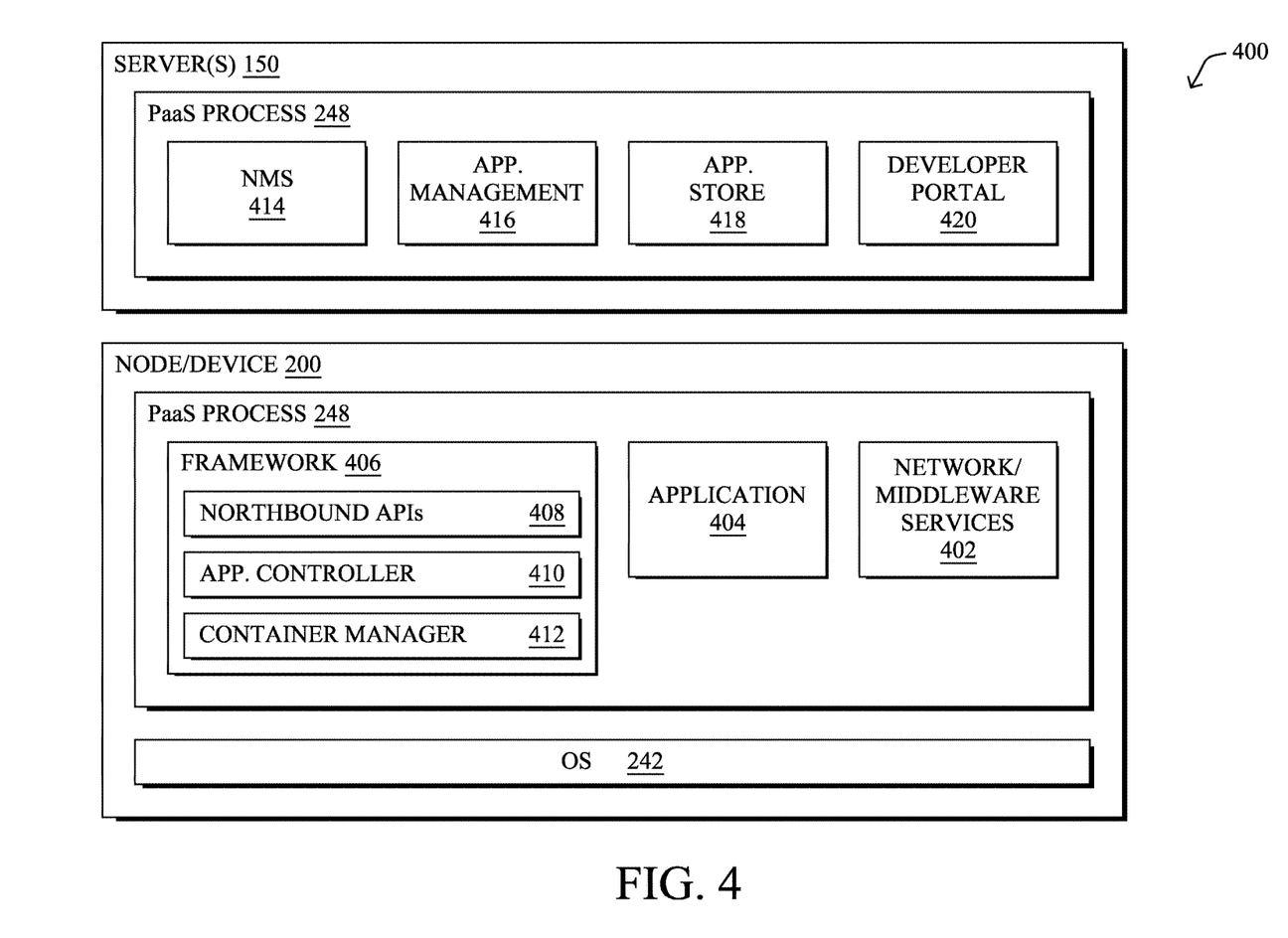
FIG. 4 illustrates an example platform as a service (PaaS) architecture.

Referring now to FIG. 4, an example PaaS architecture 400 is shown, according to various embodiments. In general, architecture 400 may allow cloud-based services and applications to be extended to the edge of the network (e.g., to access/network edge 304). In some aspects, the various networking devices (e.g., routers, switches, etc.) that are currently deployed may be leveraged to provide application/service computation and storage capabilities, beyond simply providing network connectivity to the deployed assets. In further aspects, architecture 400 may facilitate the development and deployment of applications to the network edge by providing a uniform environment to developers (e.g., by masking the heterogeneity of the underlying devices). For example, architecture 400 may leverage higher-level abstractions, software development kits (SDKs) to access middleware services, application lifecycle support, and other mechanisms, to allow applications to be hosted by the field devices. In yet another aspect, architecture 400 provides a framework and set of middleware services that define an application-independent data model for use by the deployed applications.

Notably, architecture 400 may:
Present a consistent interface to developers that is independent of the specific devices for which applications are developed;
Provide APIs for application lifecycle management operations (e.g., from a centralized system);
Support various application types (e.g., ranging from complete virtual machines to lightweight applications) using a uniform northbound interface;
Provide Bring Your Own Interface (BYOI) capabilities;
Provide a uniform hosting environment that hides disparate compute and storage mechanisms from application developers; and
Provide a gateway middleware framework that allows applications to be developed and hosted on gateways in a way that decouples the applications from the various sensor protocols.

As shown, the various components of architecture 400 may be hosted on a remote device (e.g., as part of a PaaS process 248 executed by one of servers 150), while other components may be hosted by the local node/device in or at the edge of the LLN. While certain embodiments are shown with respect to architecture 400, it is to be appreciated that the components shown are not limited as such and may be distributed across any number of different computing devices, in other embodiments.

At the heart of architecture 400 are applications 404 that may be executed locally by an LLN device/node, such as a gateway device or other network device. In many cases, applications 404 are typically not customer facing applications, but instead are extensions/agents of backend server applications hosted, e.g., in a data center or remote cloud. As would be appreciated, a particular node/device 200 may comprise any number of different hardware formats and configurations, with different capabilities.

As noted previously, a node/device 200 may execute a host operating system 242 that may be platform specific, given the different hardware types/configurations that may be present in device 200. Accordingly, the set of interfaces exposed by operating system 242 may vary across device types. In addition, certain operating systems may have different capabilities, such as the ability to host complete virtual machine-based applications or only lightweight applications.

In various embodiments, node/device 200 may include an application hosting framework 406 that provides a level of abstraction from the hosting hardware for applications 404. In particular, applications 404 may interact directly with application hosting framework 406, instead of with operating system 242. In turn, application hosting framework 406 may interact with the platform-specific services offered by operating system 242. On the northbound side (e.g., between framework 406 and the various remote processes), application hosting framework 406 may include any number of application programming interfaces (APIs) 408 that provide a common interface to the various LLN devices. As described in greater detail below, application hosting framework 406 may also include an application controller 410 that orchestrates and provides for application lifecycle management operations to be performed locally on device 200. Further, in some embodiments, application hosting framework 406 may is include an application container manager 412 that provides the mechanism by which the underlying hardware/platform of device 200 is abstracted for applications 404 in a universal manner.

In some embodiments, device 200 may include any number of network/middleware services 402 that are operable to provide gateway functionality to device 200. In particular, network/middleware services 402 may be configured to allow device 200 to support any number of different networking/sensor protocols. In addition, services 402 may use a standard data model, to abstract the received sensor data from the different protocols (e.g., by performing data aggregation, filtering, transformation, etc., on the received data). In doing so, middleware services 402 may enable more than one application to view and process the same sensor data in a consistent manner.

At the backend side (e.g., on one or more of servers 150, etc.), the remote device may execute one or more application management processes 416. In general, application management processes 416 may be operable to manage all of the lifecycle-related functions of applications 404 (e.g., the installation of a particular application, etc.). In one embodiment, application management process 416 may use APIs (e.g., REST-based APIs, etc.), to integrate with existing network management systems (e.g., an NMS process 414). For example, application management process 416 may be integrated into NMS process 414, to allow a network administrator a single view of the network and the applications deployed in the network. As noted previously, NMS process 414 may be operable to control and oversee the operations of the LLN, such as by controlling how the LLN is formed (e.g., by specifying the routing objective function), how traffic is processed by the network, etc. In another embodiment, application management process 416 may be operable to provide a stand-alone graphical user interface (GUI), such as in cases in which NMS process 414 is not used or is otherwise not integrated with application management process 416.

In some embodiments, a backend device may host a developer portal 420 that provides the primary interface between the network and application developers. For example, developer portal 420 may allow a developer to register as such and allow only authorized individuals to develop LLN/IoT applications 404. If the developer is authorized, developer portal 420 may allow the developer to access the needed SDK, documentation, forum-based support, etc., to begin development of an application. In other cases, developer portal 420 may allow a developer to implement an application within a sandbox environment, to test the operation of an application prior to deployment. As would be appreciated, developer portal 420 may be implemented as a webpage, a collection of webpages, or as a stand-alone application (e.g., a mobile app., etc.) that accesses the backend device.

In one embodiment, the backend device(s) may host an application store 418 that serves as a distribution control point for the various LLN/IoT applications that developers may create. For example, application store 418 may provide a set of REST APIs for application managers to view, publish, and/or deploy developed applications. In other words, application store 418 may function as a central application repository (e.g., across various customer networks, different systems, etc.). In other implementations, application management process 416 may store the applications for a given network.

Figure 5:
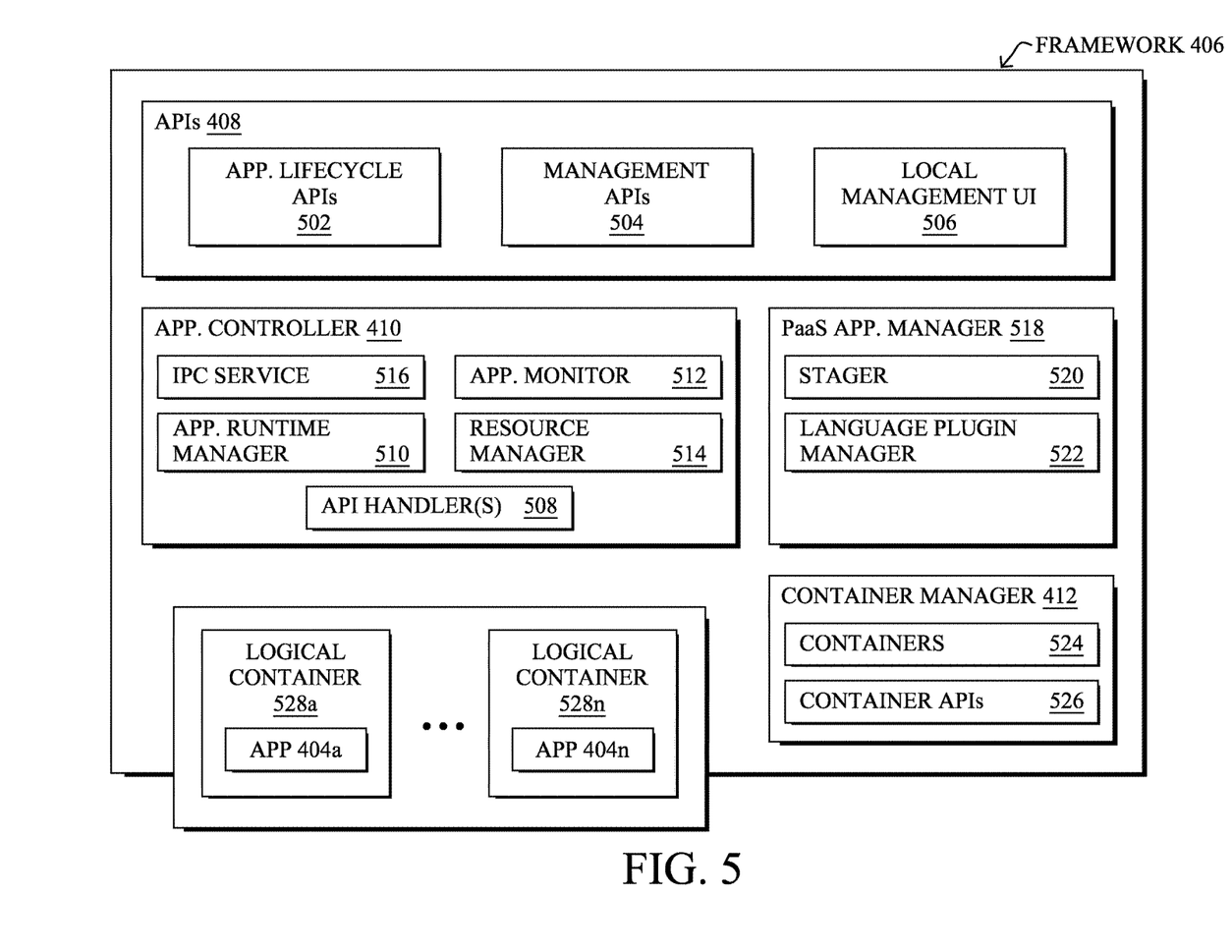
FIG. 5 illustrates an example application hosting framework for a device/node.

Referring now to FIG. 5, application hosting framework 406 is shown in greater detail, according to various embodiments. As noted previously, application hosting framework 406 is generally operable to allow applications 404 to be developed and deployed in a uniform manner that is not dependent on the underlying hardware configuration. In other words, application hosting framework 406 may provide a layer of abstraction between the application itself and the operating system services of the various device types.

In various embodiments, application hosting framework 406 may be operable to support any number of applications 404 (e.g., a first through nth application). Generally, an application 404 may include the relevant application code and/or binaries, any specific third party dependencies, and/or any operating system library dependencies. Applications 404 may also have various dependencies on web servers, database servers, kernel drivers, kernel versions, etc. A given application 404 may be of any of the following application types: 1.) a lightweight/PaaS-style application, 2.) a native application, or 3.) a virtual machine (VM) packaged application.

Lightweight/PaaS-style applications may be self-contained, portable applications that may be supported by a PaaS application manager 518. For example, such applications may be written in a dynamic language such as Java, Ruby, Python, etc. Accordingly, installation of an application of this type may include a manifest that indicates the runtime requirements and other metadata associated with the application. In one embodiment, PaaS application manager 518 may include a stager 520 operable to pre-process the application manifest and application package during application deployment. In further embodiments, PaaS application manager 518 may include a language plugin manager 522 that may use language plugins to support the different runtime environment needs of the lightweight/PaaS applications. For example, language plugin manager 522 may use a particular plugin to enable a Java runtime environment, another plugin to enable a Python runtime environment, etc.

The responsibilities of a language plugin may vary from language to language. Typically, however, pre-processing of an installation package for a lightweight application by PaaS application manager 518 may entail the following:
  identifying the specific structure of the application installation package
  resolving any library dependencies (e.g., native code in the application package may need to be compiled)
  injecting any platform-specific libraries into the application (e.g., the SDK for framework 406, etc.)
  setting up the language runtime for the application (e.g., a Python interpreter, a Java VM, etc.)
  handling different language version runtimes (e.g., Python 2.x vs. 3.x, etc.)
  paring application requirements in the manifest to create start, stop, or other custom application event hooks.

At the end of the installation process, PaaS application manager 518 may generate an archive that is ready to be deployed in a logical container (e.g., one of logical containers 528) and provide any information needed to start, stop, and/or monitor the application 404 to application controller 410. In doing so, this may create a layer of abstraction such that application controller 410 does not need to know the specific workings of the applications, but only how to start, stop, and/or monitor a given application.

Various pros and cons exist with respect to lightweight/PaaS-style applications. Notably, these types of applications may be self-contained and portable across a variety of hosting environment (e.g., by using an interpreted language, such as Java or Python). These types of applications also allow for the flexible use of different languages (e.g., via the use of different language plugins), flexibility in terms of application isolation (e.g., by executing the application in an OS-based container or in a VM-based container), and a high degree of control over the application's lifecycle management. In addition, since only the specific code and dependent libraries are needed to execute such an application, the installation package may be much smaller than other application types.

A second application type that may be supported by application hosting framework 406 is native applications. In general, applications of this type may be compiled to run natively on the host operating system (e.g., operating system 242) without any virtualization. Optionally, such applications may be packaged to run within a container infrastructure such as Docker, LXC, etc., if the host operating system supports it. Thus, an installation package for an application of this type may include compiled application code, the dependent libraries, any needed configuration files or scripts to support the application, any language runtimes or frameworks used by the application, and/or any operating system distribution related files/libraries. Such an installation package may also include a manifest that indicates the runtime requirements or other metadata associated with the application.

While native applications may be self-contained, these types of applications are is also tied to the specific hardware architecture of the host device. This means that the root file system components, binaries, etc., need to be compiled to match the architecture of the host hardware. In addition, native application installation packages may be larger in comparison to those of lightweight applications. Further, lifecycle management support may be limited for native applications, as application controller 410 may have limited or no visibility into the relevant details of the running application.

A final application type that may be supported by framework 406 is VM-packaged applications, in some embodiments. In such cases, the application package may include VM-related data such as the virtualized operating system on which the application is to run, as well as the relevant libraries. Notably, an application package for a VM-based application may include the application code, the OS kernel, any dependent libraries, configuration files or scripts, language runtimes and frameworks, and/or OS distribution related files or libraries. Such applications may be particularly suited for legacy applications, applications that require a specific operating system environment or version, and applications that require the installation of custom device drivers.

While VM-packaged applications may still be self-contained and portable, the installation packages may be much larger than those of native or lightweight application types (e.g., since the entire OS distribution may be included). These types of applications also allow a developer to have complete flexibility to include any needed kernel patches, modules, etc., but at the cost of additional work to package and maintain these types of applications. Further, VM-packaged applications may offer only limited isolation (e.g., at the VM level) and may allow only limited control of the application's lifecycle.

In various embodiments, application hosting framework 406 may include an application container manager 412. In general, application container manager 412 provides an abstraction to framework 406 that hides the heterogeneous hosting hardware across different devices. Particularly, container manager 412 may create and manage logical container instances 528 in which the various applications 404 may be executed. In some cases, container manager 412 may receive as input any or all of the following: information to start, stop, and/or monitor the application, map and mount any specified files or folders into the container (e.g., for lightweight and native applications, particularly), and enforce any resource constraints specified by the container.

To provide a level of abstraction between the different application types and the heterogeneous hosting hardware, container manager 412 may maintain a mapping between logical containers 528 and any real container types 524 supported by the device (e.g., in conjunction with container APIs 526). Example container types 524 may include, but are not limited to, any of the following:

Process Container—a container type associated with a set of processes, but provides little isolation among different process containers and little control on resource constraints.

LXC/Docker Container—a container type built on the LXC capabilities in Linux.

ESXi Container—a container type that creates VM-packaged applications using VMware ESXi APIs KVM Container—a container type that creates VM-packaged applications using KVM. This type may use appropriate libraries such as Bento Box or Libvirt to archive the application.

VMAN Container—a container type that creates VM-packaged applications using VMAN APIs.

In various embodiments, an application of any given type may be mapped to a container of any given type. For example, a VM-packaged application may be mapped to an ESXi or KVM container. Similarly, container manager 412 may transparently map a lightweight application to an LXC container type.

Also as shown in FIG. 5, application hosting framework 406 may include an application controller 410 that is responsible for the lifecycle operations of applications 404. Such operations may include, but are not limited to, installing an application, uninstalling an application, applying any resource constraints to an application (e.g., via a resource manager process 514), updating the configuration of an application, starting or stopping an application, upgrading an application, backing up or restoring an application, monitoring an application (e.g., via an application monitor process 512), performing runtime management of an application (e.g., via application runtime manager process 510), or performing troubleshooting operations for an application. To facilitate these operations, application controller 410 may include an inter-process communication service 516 and/or any number of API handlers 508 (e.g., to handle northbound APIs 408, etc.).

In some embodiments, application controller 410 may coordinate with application management process 416 to manage the lifecycles of applications 404. In one embodiment, application controller 410 and application management process 416 may use a policy-based mechanism that takes into account the various constraints of the LLN and/or the WAN. For example, LLN devices may be grouped automatically or manually using tags. In turn, a given application policy may be assigned to a particular tag or set of tags. Example policies may include, but are not limited to, minimizing bandwidth usage during peak times (e.g., by defining windows during which applications can or cannot be downloaded to the device), optimizing bandwidth for application operations, etc. In some cases, an application policy may be further based on the network topology. Example operations that may be taken to reduce bandwidth usage by the application lifecycle management functions may include, but are not limited to, using the topology of the network to enable application peer-to-peer distribution, selecting among application types that require differently sized application packages, distributing application packages on a pull basis, compressing application packages during download, collecting bandwidth metrics less frequently, only performing bandwidth-intensive operations when the primary uplink of the device is active, or the like.

APIs 408 used by application hosting framework 406 may include various application lifecycle management APIs 502, general device/system management APIs 504, and/or local management user interface (UI) APIs 506. Broadly, APIs 502-506 may be operable to provide any or all of the following services: authentication services (e.g., API authentication), application management (e.g., installing/uninstalling applications 408, stopping/starting applications 404, communicating application-related data, updating or upgrading applications 404 or their associated configurations, etc.), application monitoring (e.g., on a push or pull basis), host platform monitoring (e.g., communicate information regarding the current state of device 200, etc. Local management UI APIs 506 may be operable to provide a local user interface for the management of device 200 (e.g., without the use of an NMS or other supervisory device). For example, APIs 506 may expose a local web-based interface or interact with a management application, to allow an administrator to control the operation of device 200.

Figure 6:
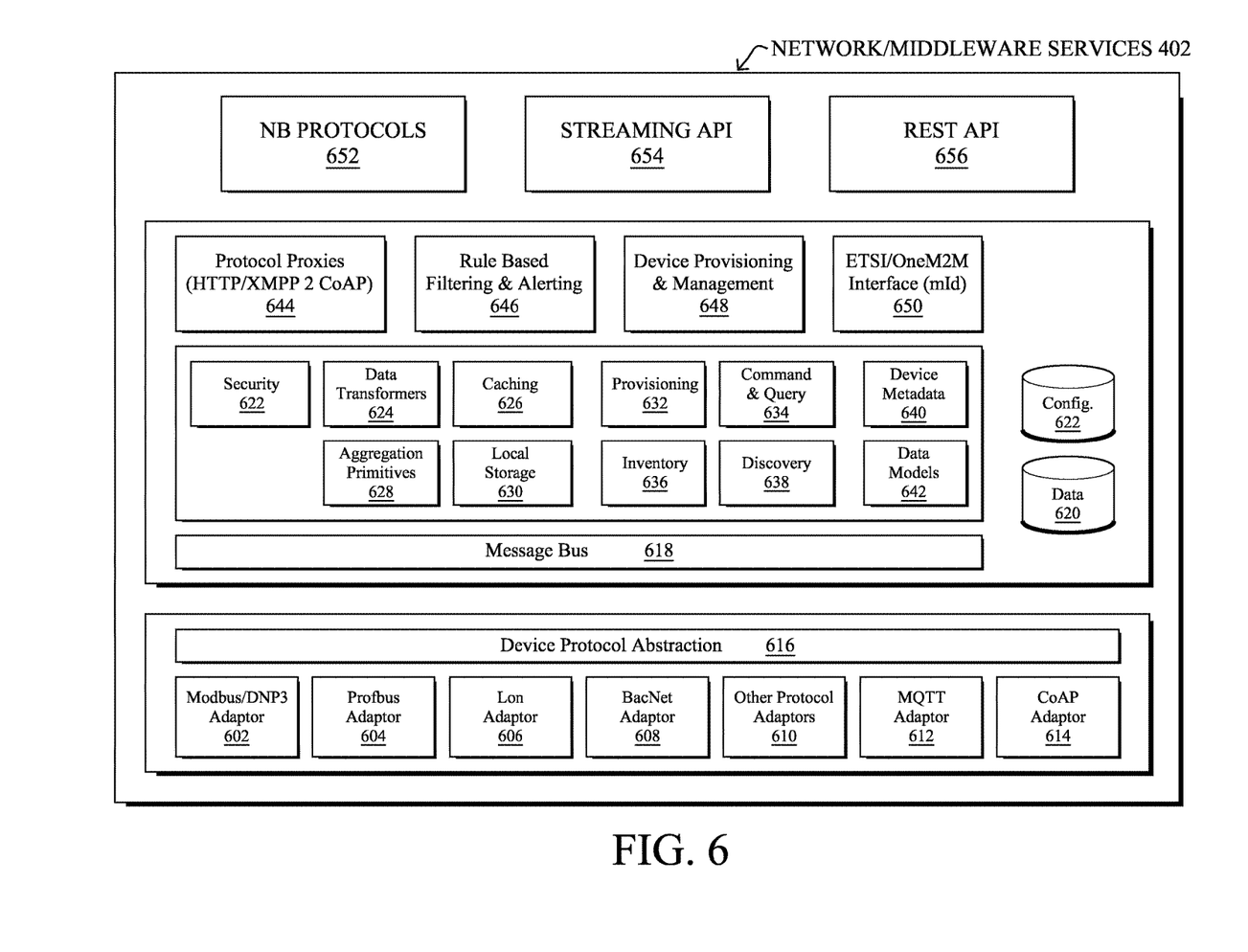
FIG. 6 illustrates example network/middleware services for a device/node.

Referring now to FIG. 6, network/middleware services 402 are shown in greater detail, according to various embodiments. In general, network/middleware services 402 may be operable to interface with deployed assets (e.g., sensors, etc.) and provide a layer of abstraction between the deployed devices and applications 404. In some aspects, services 402 may be operable to provide any or all of the following features:

Breaking the prevalent "one application to one device" siloed model.

Enabling more than one hosted application to receive sensor data at the same, without being aware of each other.

Enabling applications to be independent of sensors and sensor protocols by enabling the developers to develop applications to a device protocol abstraction Providing a common data model that further abstracts applications from domain specific data formats.

Providing the ability to batch, store, and forward sensor data, in the event of network disruptions.

Providing the ability to understand device sleep cycles/state and respond with cached data for direct sensor data queries.

Implementing protocol conversions that facilitate applications such as IoT applications and cloud-based IoT platforms, to indirectly communicate with sensors using standard protocols such as HTTP, XMPP, etc.

In some embodiments, network/middleware services 402 may interact with applications 404 through the use of an SDK, to provide applications 404 access to data from the various deployed assets. For example, assume that the device hosting services 402 is in communication with various sensors deployed throughout a factory or other location. Also, assume that a lightweight application 404 developed using the SDK has been deployed to the device. In such a case, services 402 may receive sensor data from the deployed sensors and provide the application with the sensor data. In turn, the application may forward raw or aggregated sensor data to a remote device, such as a device hosting cloud-based or data room-based application (e.g., a business application, an analytics application, etc.).

As shown in FIG. 6, network/middleware services 402 may include a data collection layer that is responsible for collecting data from deployed assets, such as sensors. In various embodiments, this layer may use a plugin model, with each plugin supporting a different protocol. A plugin manager (e.g., device provisioning and management process 648) may manage the various plugins. For example, on startup, the plugin manager may scan a known subdirectory for plugin description files. Such files may include metadata describing the particular plugin, the protocol that the plugin implements, how to start the plugin, or other information needed to load the plugin.

Example plugins that may be used by network/middleware services 402 may include, but are not limited to, a Modbus/DNP3 Adaptor 602, a Profibus Adaptor 604, a Lon Adaptor 606, a BacNet Adaptor 608, an MQTT Adaptor 612, a CoAP Adaptor 614, and/or other protocol adaptors 610. These adaptors may be configured to report data continuously from the networked assets, receive commands to be communicated to the assets, or monitor a particular device. For example, CoAP Adaptor 614 may operate as a CoAP server to communicate with a sensor that acts as a CoAP client.

In various embodiments, network/middleware services 402 may include a device protocol abstraction process/service 616 that is operable to convert data received via any or all of adaptors 602-614 into a canonical format using a common data model 642. For example, protocol abstraction process 616 may provide a set of APIs to transform sensor data received via different formats or protocols into a common format. By doing so, the local and remote applications that make use of the received sensor data and/or provide commands to a network asset do not need knowledge of the actual protocol used to communicate with that asset.

Network/middleware services 402 may also include a message bus 618 via which the various processes that are part of services 402 (e.g., any or all of processes 622-638, etc.), installed applications 404, and other applications may access the asset data in the common format and pass messages to the various assets.

In some aspects, services 402 may include processes that are operable to manage and control network assets. For example, services 402 may include device metadata 640 that provides structure for capturing data from sensors and other assets. For example, metadata 640 may include information regarding the device type, the unit of measurement, the protocol used by the device, or other information. Discovery process 638 may be operable to discover networked assets (e.g., using plugins/adaptors 602-614). Alternatively, or in addition thereto, a device provisioning process 632 may directly provision a device, in response to receiving a command to do so from a northbound device. Inventory process 636 may be operable to maintain an inventory of networked assets, in one embodiment. The device inventory may be constructed either in conjunction with discovery process 638 and/or provisioning process 632. In one embodiment, the device inventory may comprise a hierarchy of nodes where each node is a group or individual sensor. Each sensor device in the inventory may be represented by a unique identifier, a location or path that uniquely identifies the device, etc.

For example, an OBDII scanner connected to a vehicle may model the sensors of the vehicle as:

/root/vehicle/OBDII/ECM/intake-air-temperature
/root/vehicle/OBDII/TCM/engine-rpm
/root/vehicle/OBDII/ACM/vehicle-speed where ECM refers to the engine control module of the vehicle, TCM refers to the transmission control module of the vehicle, and ABS refers to the antilock brake system of the vehicle. In another example, assets in a home automation system may be represented as:

/root/home/living-room/thermostat
/root/home/living-room/side-lamp
/root/home/living-room/clock where living-room refers to the physical location of the assets.

Command and query process 634 may be operable to expose each networked asset as a resource to northbound devices. For example, process 634 may expose each inventoried asset as a REST resource and expose these resources to other devices outside of the LLN via REST APIs 656. This allows each asset to be managed individually. For example, a particular sensor may be queried for sensor data (e.g., using a GET function in REST) or issued a command (e.g., using a POST function in REST).

In various embodiments, network/middleware services 402 may be operable to store, process, and/or forward collected data from the various assets in communication with the device. As shown, a caching process 626 and/or a local storage 630 process may be operable to cause data 620 received from the various assets to be stored by the device. In some embodiments, services 402 may also perform data processing on the received data such as aggregating data 620 (e.g., using aggregation primitives 628) or otherwise transforming data 620 (e.g., using data transformers 624). For example, services 402 may calculate statistics (e.g., averages, etc.) for the received sensor data, calculated values using the received sensor data (e.g., calculating a rate by dividing sensor readings by time, etc.), or the like.

Network/middleware services 402 may be operable to expose the collected and/or processed sensor data to the various management devices outside of the LLN. For example, services 402 may include a rule-based filtering and alerting module 646 that allows access to the data. Module 646 may, in various cases, use REST-based APIs 656, Streaming APIs 654 (e.g., for real-time updating of sensor measurements, etc.), other northbound protocols 652, protocol proxies 644 (e.g., HTTP/XMPP to CoAP, etc.), an ETSI Interface 650, or the like, to provide access between applications 404, devices outside of the LLN (e.g., in the cloud, data center, etc.), and the deployed assets networked to the device. A security module 622 may also provide security to the data passed to and from the local device. For example, security module 622 may encrypt data 620 stored locally and/or when communicating data 620 with another device via process 646. In various embodiments, process 646 may provide sensor data on a push basis (e.g., to a registered IoT application in the cloud or data center) or on a pull basis (e.g., in response to receiving a request from the application).

Process 646 may also be operable to employ any number of configurable rules (e.g., configurations 622), to control how, when, and why data is to be provided to a local application 404 or to a northbound application. For example, process 646 may provide an alert to an IoT application running outside of the LLN in response to a particular sensor measurement crossing a defined threshold. In other cases, process 646 may perform filtering on the exposed data. For example, process 646 may limit which information is provided based on an access level, application type, or other configurable parameter.

Figure 7:
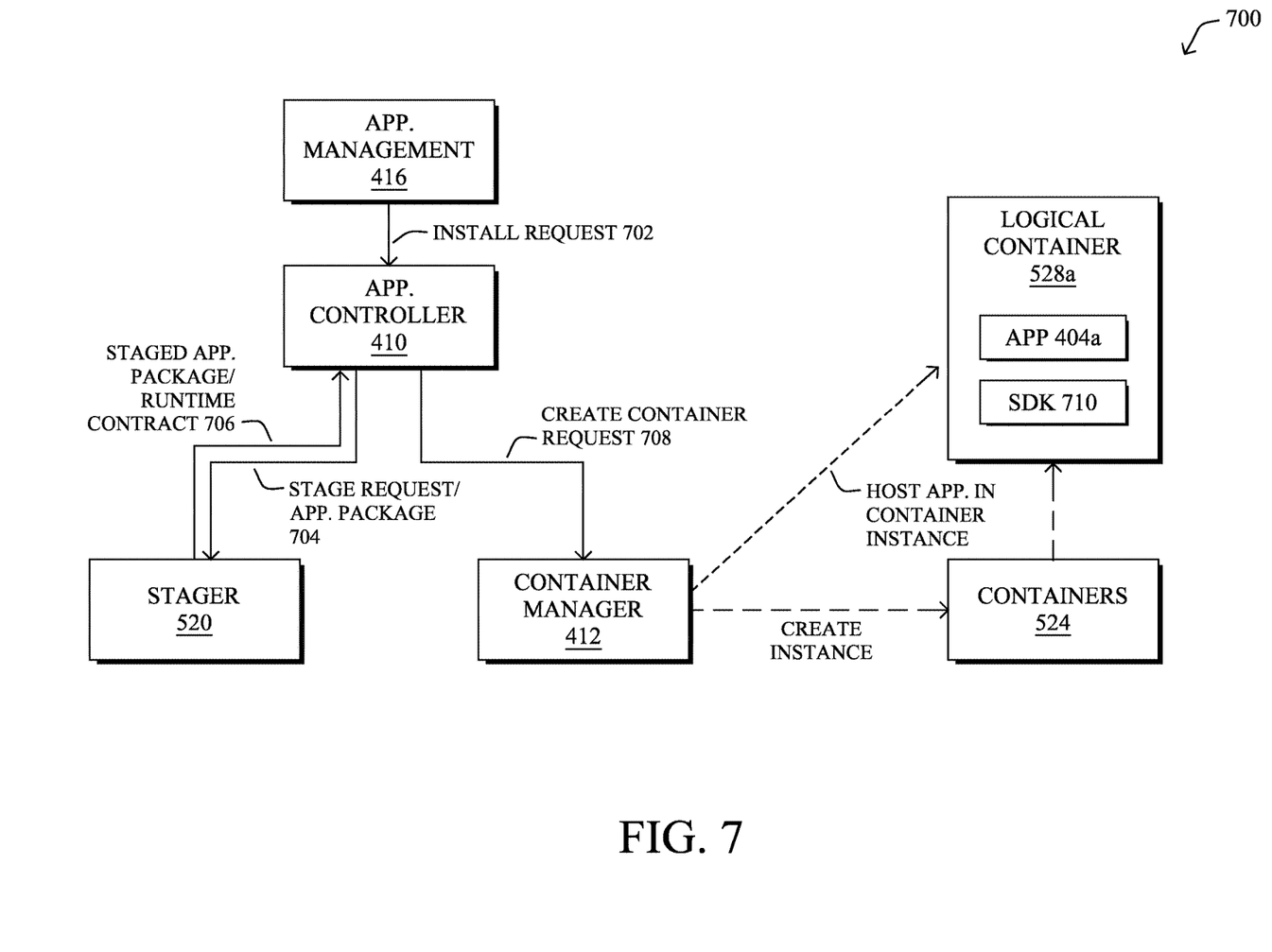
FIG. 7 illustrates an example of an application being installed on a device.

Referring now to FIG. 7, an example 700 is shown of an application 404a being installed onto a device (e.g., device 200). As shown, application management process 416 (e.g., as executed by a device/server in the cloud or data center) may send an installation request 702 to the local application controller 410. As described above, application controller 410 may be part of the application hosting framework 406 of the local device and be configured to manage the lifecycles of installed applications 404 on the device. Also as described above, installation request 702 may include the application or code for the application, any dependent libraries, and an installation manifest that indicates information regarding the application (e.g., the runtime requirements of the application, the type of application, etc.).

Assume for sake of illustration that application 404a is a lightweight/PaaS style application. However, in other embodiments, the application for installation may be of any of the other application types described above (e.g., native or VM-based applications).

In response to receiving installation request 702, application controller 410 may send a staging request 704 to stager 520. Request 704 may include, for example, the application package from installation request 702 or at least a portion thereof. For example, application controller 410 may provide the application manifest to stager 520, to begin staging the application. In general, stager 520 may be operable to process the application manifest and application package, to generate the staged package (e.g., in conjunction with language plugin manager 522). For example, stager 520 may resolve any dependencies in the application package, generate start and stop scripts for application 404a, create file system mappings, etc., to generate the staged package. Stager 520 may then return the staged application package 706 to application controller 410. In one embodiment, application package 706 may also include runtime contract data (e.g., start and stop scripts, etc.), to control the runtime of application 404a.

Once the application has been staged, application controller 410 may determine the appropriate container type for the application. As noted previously, a lightweight/PaaS style application may be executed within any number of different types of containers, to provide runtime isolation for the application. Application controller 410 may then provide a create container request 708 to container manager 412

Application controller 410 may provide the staged application package as part of a create container request 708 to container manager 412. Request 708 may include, in various cases, the application package, any runtime contract data, an indication of the container type, and any other information that container manager 412 may need to create a container instance 528a for application 404a.

In response to receiving create container request 708, container manager 412 may generate a logical container instance 528a using the appropriate container type 524 and host application 404a within container instance 528a. Thus, application 404a may be isolated logically from other installed applications 404. Also as shown, since application 404a is built using an SDK 710 that supports the techniques herein, the executed application 404*a* may be operable to interact with application controller 410 (e.g., to manage and monitor the execution of application 404*a*), network/middleware services 402, and/or other processes described herein.

Figure 8:
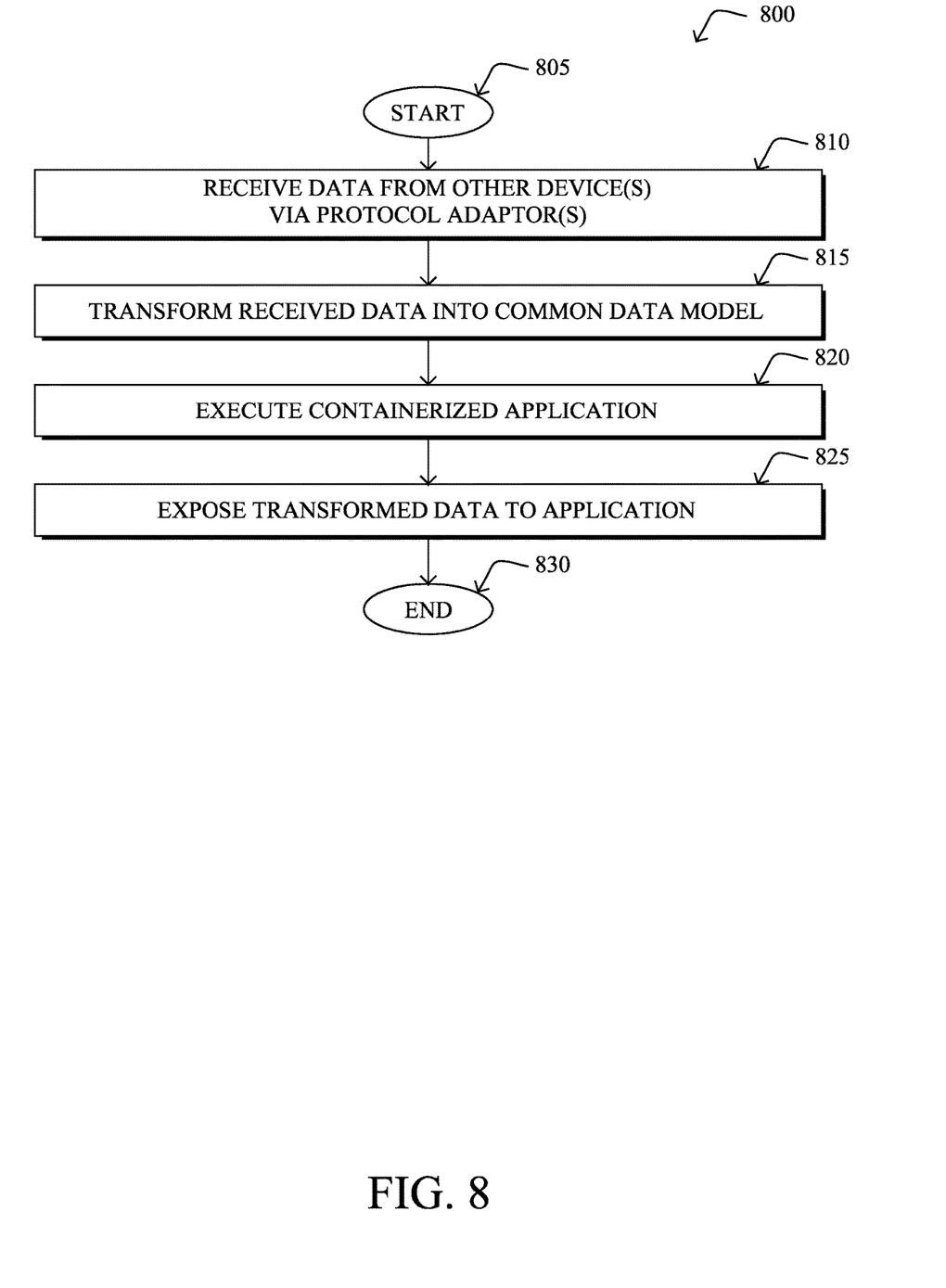
FIG. 8 illustrates an example simplified procedure for implementing an application hosting environment that masks device heterogeneity.

Referring now to FIG. 8, an example simplified procedure 800 is shown implementing an application hosting environment that masks device heterogeneity. Procedure 800 may be performed, for example, by a device (e.g., device 200) executing machine instructions (e.g., PaaS process 248), such an LLN gateway or other device. Procedure 800 begins at step 805 and continues on to step 810 where, as described in greater detail above, the device receives data from one or more other devices via one or more protocol adaptors. For example, the device may receive sensor data from deployed sensor assets using any number of different protocols (e.g., CoAP, Lon, etc.).

At step 815, as detailed above, the device may transform the received data into a common data model. In particular, sensor data received via different protocols or in different formats may be processed into a common data model. For example, assume that one sensor provides temperature readings in Celsius and another sensor provides temperature readings in Fahrenheit. In such a case, these temperature readings may be converted into a common format (e.g., Fahrenheit). In some embodiments, the common data model may also identify the asset or assets from which the data was received. For example, the common data model may include metadata associated with a particular sensor reading that identifies the sensor. This metadata may also be used to form a logical relationship between the different assets (e.g., to represent an automation process, to represent physical connections between assets, to represent the physical locations of the assets, etc.).

At step 820, the device may execute a containerized application, as described in greater detail above. In general, executing an application within a logical container allows the execution of the application to be isolated from other applications. Example application types may include, but are not limited to, VM-based applications, native applications for the device (e.g., applications that are compiled to run natively on the device), and lightweight/PaaS style applications (e.g., Java-based applications, Python-based applications, etc.).

At step 825, the device may expose the transformed data in the common data model to the executed application, as described in greater detail above. For example, the application may be operable to monitor, report, and/or control the one or more assets in a manner that does not require the application to be closely tied to the specific hardware and protocols used by the device. Procedure 800 then ends at step 830.

It should be noted that while certain steps within procedure 800 may be optional as described above, the steps shown in FIG. 8 are merely examples for purposes of illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide an architecture that allows for the rapid development and deployment of applications to network nodes/devices (e.g., an LLN gateway, etc.). In some aspects, the techniques herein provide for a layer of abstraction between an application and the underlying hardware and protocols of the device, thereby allowing an application to be developed and deployed uniformly across different device types. In further aspects, application lifecycle management techniques are introduced to control which applications are installed and executed by a device, as well as how the applications are executed.

While there have been shown and described illustrative embodiments that provide for a hosting environment that masks device heterogeneity, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of computing networks. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, data from one or more other devices in the network via one or more protocol adaptors;
   transforming, by the device, the received data into a common data model;
   receiving, at the device, an installation package that includes a containerized application;
   generating, by the device, a container instance, in response to receiving the installation package;
   hosting, by the device, the application in the generated container instance;
   executing, by the device, the application; and
   exposing, by the device, the transformed data to the application.

2. The method as in claim 1, wherein the one or more other devices comprise sensors and the received data comprises sensor data.

3. The method as in claim 1, wherein the application is executed within a virtual machine.

4. The method as in claim 1, wherein the application is executed natively in an operating system of the device.

5. The method as in claim 1, wherein the application is a Java-based application or a Python-based application.

6. The method as in claim 1, wherein the one or more protocol adapters are operable to communicate with the one or more other devices using one or more of: Modbus messaging, Profibus messaging, Lon messaging, BacNet messaging, CoAP messaging, or MQTT messaging.

7. The method as in claim 1, wherein the device is a gateway for the network.

8. The method as in claim 1, further comprising:
   providing, by the device, the transformed data to a remote device.

9. An apparatus, comprising:
one or more network interfaces to communicate with a network;
a processor coupled to the network interfaces and configured to execute one or more processes; and
a memory configured to store a process executable by the processor, the process when executed operable to:
receive data from one or more other devices in the network via one or more protocol adaptors;
transform the received data into a common data model;
receive an installation package that includes a containerized application;
generate a container instance, in response to receiving the installation package;
host the application in the generated container instance;
execute the application; and
expose the transformed data to the application.

10. The apparatus as in claim 9, wherein the one or more other devices comprise sensors and the received data comprises sensor data.

11. The apparatus as in claim 9, wherein the application is executed within a virtual machine.

12. The apparatus as in claim 9, wherein the application is executed natively in an operating system of the apparatus.

13. The apparatus as in claim 9, wherein the application is a Java-based application or a Python-based application.

14. The apparatus as in claim 9, wherein the one or more protocol adapters are operable to communicate with the one or more other devices using one or more of: Modbus messaging, Profibus messaging, Lon messaging, BacNet messaging, CoAP messaging, or MQTT messaging.

15. The apparatus as in claim 9, wherein the apparatus is a gateway for the network.

16. The apparatus as in claim 9, wherein the process when executed is further operable to:
provide the transformed data to a remote device.

17. A tangible, non-transitory, computer-readable media having software encoded thereon, the software when executed by a processor of a device is operable to:
receive data from one or more other devices in the network via one or more protocol adaptors;
transform the received data into a common data model;
receive an installation package that includes a containerized application;
generate a container instance, in response to receiving the installation package;
host the application in the generated container instance;
execute the application; and
expose the transformed data to the application.

18. The computer-readable media as in claim 17, wherein the one or more other devices comprise sensors and the received data comprises sensor data.

19. The computer-readable media as in claim 17, wherein the application is a Java-based application or a Python-based application.

20. The computer-readable media as in claim 17, wherein the one or more protocol adapters are operable to communicate with the one or more other devices using one or more of: Modbus messaging, Profibus messaging, Lon messaging, BacNet messaging, CoAP messaging, or MQTT messaging.

* * * * *

UNITED STATES PATENT AND TRADEMARK OFFICE
CERTIFICATE OF CORRECTION

PATENT NO. : 9,912,494 B2
APPLICATION NO. : 14/824271
DATED : March 6, 2018
INVENTOR(S) : Nethi et al.

Page 1 of 1

It is certified that error appears in the above-identified patent and that said Letters Patent is hereby corrected as shown below:

In the Specification

In Column 3, Line 47, please amend as shown:
or no memory (e.g., no memory for storage other than for In Column 5, Line 34, please amend as shown:
point-to-point (MP2P) traffic from devices inside the LLN In Column 6, Line 3, please amend as shown:
are generally not part of a DAG since there is no forward In Column 9, Line 10, please amend as shown:
work 406 may include an application container manager In Column 11, Line 36, please amend as shown:
types of applications are also tied to the specific hardware Signed and Sealed this
First Day of December, 2020

Andrei Iancu
*Director of the United States Patent and Trademark Office*